US005534982A

United States Patent [19]

Sakaizawa et al.

[11] Patent Number: 5,534,982

[45] Date of Patent: Jul. 9, 1996

[54] DEVELOPING APPARATUS

[75] Inventors: Katsuhiro Sakaizawa, Tokyo; Motoo Urawa, Yokohama; Tsutomu Kukimoto, Yokohama; Satoshi Yoshida, Yokohama, all of Japan

[73] Assignee: Canon Kabushiki Kaisha, Tokyo, Japan

[21] Appl. No.: 205,107

[22] Filed: Mar. 3, 1994

[30] Foreign Application Priority Data

| | | | |
|---|---|---|---|
| Mar. 3, 1993 | [JP] | Japan | 5-042734 |
| Jul. 22, 1993 | [JP] | Japan | 5-201249 |

[51] Int. Cl.$^6$ .......... G03B 21/00; G03B 15/06

[52] U.S. Cl. .......... 355/246; 355/214; 355/245; 355/251

[58] Field of Search .......... 355/246, 214, 355/245, 251

[56] References Cited

U.S. PATENT DOCUMENTS

| | | | |
|---|---|---|---|
| 4,448,870 | 5/1984 | Imai et al. | 430/207 |
| 4,590,140 | 5/1986 | Mitsuhashi et al. | 430/102 |
| 4,702,986 | 10/1987 | Imai et al. | 430/120 |
| 4,737,432 | 4/1988 | Tanaka et al. | 430/110 |
| 4,952,476 | 8/1990 | Sakashita et al. | 430/106 |
| 4,957,840 | 9/1990 | Sakashita et al. | 430/106.6 |
| 4,985,327 | 1/1991 | Sakashita et al. | 430/106.6 |
| 5,014,089 | 5/1991 | Sakashita et al. | 355/251 |
| 5,043,239 | 8/1991 | Kukimoto | 430/100 |
| 5,137,796 | 8/1992 | Takiguchi et al. | 430/106.6 |
| 5,139,914 | 8/1992 | Tomiyama et al. | 430/106.6 |
| 5,180,649 | 1/1993 | Kukimoto et al. | 430/106.6 |
| 5,202,731 | 4/1993 | Tanikawa et al. | 355/251 |
| 5,210,617 | 5/1993 | Tomiyama et al. | 358/300 |
| 5,215,845 | 6/1993 | Yusa et al. | 430/106.6 |
| 5,217,836 | 6/1993 | Takiguchi et al. | 430/106.6 |
| 5,220,383 | 6/1993 | Enoki et al. | 355/246 |
| 5,245,391 | 9/1993 | Suzuki et al. | 355/246 |
| 5,262,267 | 11/1993 | Takiguchi et al. | 430/122 |
| 5,270,143 | 12/1993 | Tomiyama et al. | 430/109 |
| 5,270,770 | 12/1993 | Kukimoto et al. | 355/274 |

FOREIGN PATENT DOCUMENTS

| | | | |
|---|---|---|---|
| 4128942 | 7/1992 | Germany | 355/246 |
| 50-13661 | 2/1975 | Japan . | |
| 59-46664 | 3/1984 | Japan . | |
| 1112253 | 4/1989 | Japan . | |
| 2284158 | 11/1990 | Japan . | |
| 4-162059 | 6/1992 | Japan | 355/246 |

*Primary Examiner*—Matthew S. Smith
*Attorney, Agent, or Firm*—Fitzpatrick, Cella, Harper & Scinto

[57] ABSTRACT

A developing apparatus includes a developer carrying member for opposing to an image bearing member bearing an electrostatic image, and for carrying a developer to develop the electrostatic image on the image bearing member, the developer having a polarity which is the same as a charging polarity of the image bearing member, and a bias voltage source for applying an oscillating bias voltage to the developer carrying member. The bias voltage oscillates interposing an image portion potential of the image bearing member, and an absolute value of a peak level of a background portion side potential is smaller than an absolute value of a background portion potential.

9 Claims, 10 Drawing Sheets

DEVELOPING APPARATUS

FIELD OF THE INVENTION AND RELATED ART

The present invention relates to a developing apparatus for developing an electrostatic image with developer and usable with an image forming apparatus of an electrophotographic or electrostatic recording type, such as a copying machine, printer or the like.

It is widely known that a developer carrying member such as a developing sleeve for carrying one component developer (toner) into a developing zone, is disposed opposed to an image bearing member such as an electrophotographic photosensitive member, the developer carrying member being supplied with a developing bias voltage.

It is also known that the developing bias voltage may include a voltage V51 for urging the toner from the developer carrying member both to the portion of the image to be visualized and the background portion thereof, and a voltage V52 for urging the toner to the developer carrying member both from the portion of the latent image to be visualized and the background portion thereof, wherein the voltages are repeated (oscillating voltage). The developing bias voltage is applied to the developer carrying member.

An oscillating bias voltage waveform is shown in FIG. 5, which is a bias voltage waveform when the negative polarity electrostatic latent image is reverse-developed with toner charged to the negative polarity. In FIG. 5, VD is a potential at the background portion of the electrostatic latent image; and VL is a potential of the part of the latent image to be visualized. The toner is deposited to the potential VL portion, that is, the portion of the electrophotographic photosensitive member exposed to the light, thus visualizing the image.

As shown in FIG. 5, in a period C of the oscillating bias voltage, the voltage V51 appears for the time period T51, and subsequently, the voltage V52 appears for the time period T52.

The potential VL of the part of the electrostatic latent image to be visualized and the background potential VD, are between the voltages V51 and V52. In other words, the level of the voltage V51 is across the background potential VD from the potential VL of the portion to be visualized (which will hereinafter be called "visualizing portion"), and the level of the voltage 52 is across the visualizing portion potential VL from the background potential VD.

Accordingly, the toner charged to the negative polarity transfers from the developer carrying member both to the visualizing portion (VL) of the electrostatic latent image and to the background (VD) portion during time period T51, although the amount of the toner per unit area transferred to the background portion is smaller than that to the visualizing portion.

A part of the toner having been deposited on the visualizing portion (VL) and most of the toner having been deposited on the background portion, transfer back to the developer carrying member during the time period T52.

The above operations are repeated to develop the electrostatic latent image.

The fine particles of toner existing in the toner have a large surface area per unit weight, and therefore, tend to be overcharged through triboelectricity. If an overcharged fine toner particle is deposited on the background portion (VD) by the electric field provided by the voltage V51, then the fine particle toner is strongly attracted to the image bearing member by strong electrostatic mirror force. Depending on the electric field provided by the voltage 52 (or depending on the electric field and the magnetic field when the toner is magnetic), it does not transfer back to the developer carrying member, with the result of production of fog.

With small size toner particles (e.g., having a weight average particle size of 4–10 μm), the amount of the overcharged toner is relatively large with the result of the fog production.

If one component magnetic developer (magnetic toner) is used, the following inconvenience arises.

To the magnetic toner in the developing zone, magnetic force provided by a magnet roll contained in the developer carrying member is applied, and therefore, a so-called toner chain which is produced by toner transferred from the developer carrying member to the image bearing member being connected into a form of a chain along the magnetic lines of force on the image bearing member.

Such toner chains result in a number of stripes at an end of a toner image A as shown in FIG. 6, by which so-called trailing B is produced, and the transferred image involves a defect.

The causes for producing the toner chains which are the major cause of the trailing B, include the magnetic field and the alternating electric field in the developing zone. The magnetic field promotes magnetic toner brush formation on the developer carrying member and promotes formation of toner chains on the image bearing member. The alternating electric field promotes collection of toner constituting the chains from the neighborhood.

The developing bias voltage shown in FIG. 5 is applied to the developer carrying member 5 (FIGS. 7)(*a*) and (*b*). When the voltage V51 is first applied for the time period T51, toner is collected on the visualizing portion by an edge effect adjacent the boundary between the visualizing portion (VL) and the background portion (VD) on the image bearing member 1, as shown in FIG. 7(*a*). Thereafter, when the voltage V52 is applied to the developer carrying member 5 for the time period T52, toner collected on the visualizing portion of the electrostatic latent image for the time period T51, is returned to the opposite developer carrying member 5, so that higher toner chains than before the one cycle of the developing bias voltage is applied are formed by the magnetic field provided by a magnetic pole S on the developer carrying member 5. While the cyclic operation is repeated, the brush of toner extended from the developer carrying member 5 is transferred onto the image bearing member 1, and remains on the image bearing member 1 in the form of long toner chains. This is a cause of the production of the trailing.

In a so-called contact developing method in which the image bearing member is rubbed with the magnetic brush of the magnetic toner on the developer carrying member in the developing zone, the toner layer deposited on the visualizing portion of the electrostatic latent image is mechanically stirred by the magnetic brush carried on the developer carrying member, and therefore, the above-described trailing does not occur. However, in the case of non-contact development, in which the thickness of the developer layer is smaller than the minimum clearance between the developer carrying member and the image bearing member in the developing zone, the abovedescribed trailing occurs.

The force by which the toner is collected on the visualizing portion from the neighborhood increases with an increase of |V51–VL|, and therefore, the trailing becomes remarkable with the increase thereof.

The trailing is a significant problem when a graphic image is to be formed or when highly fine images are formed using small size toner.

In an attempt to avoid the trailing, the inventors applied the oscillating bias voltage shown in FIG. 8 to the developer carrying member with a small peak-to-peak voltage Vpp (the difference between the maximum and minimum of the oscillating voltage) of the oscillating bias voltage.

In FIG. 8, the electrostatic latent image of the relative polarity is reverse-developed with the magnetic toner charged to the negative polarity.

In FIG. 8, the voltage levels of the two peaks V61 and V62 of the oscillating bias voltage are between the potential VL of the visualizing portion of the electrostatic latent image and the background potential VD.

Therefore, during the time period T61, the toner is transferred from the developer carrying member to the visualizing portion (VL) of the electrostatic latent image, but the toner does not move toward the background portion (VD) of the electrostatic latent image.

On the other hand, during time period T62, the voltage 62 urges the toner from the developer carrying member to the visualizing portion (VL), and the toner is transferred toward the visualizing portion (VL).

With the oscillating bias voltage of FIG. 8, an electric field for urging the toner from the image bearing member to the developer carrying member is not formed in the visualizing portion of the electrostatic latent image or in the background portion thereof.

However, since the toner ,does not move to the background portion (VD) during the time period T61, no fog is produced with the oscillating bias voltage of FIG. 8.

In addition, |VL−V61| of FIG. 8 is smaller than |VL−V51| of FIG. 5, and therefore, the toner collecting force to the visualizing portion is smaller, and therefore, the above-described trailing phenomenon occurs. However, with the oscillating bias voltage shown in FIG. 8, the toner existing in the visualizing portion of the electrostatic latent image is not transferred back to the developer carrying member. For this reason, as shown in FIG. 9, the boundary K between the visualizing portion and the background portion tends to be non-smooth, with the result of less sharp image.

An image having a less sharp edge is not clear, and in addition, is blurred in the case of a graphic image or font, thus deteriorating the print quality.

In addition, since the peak level of the bias voltage is low, a high density image is not provided.

In foregoing, the description has been made with respect to a one component magnetic developer. However, even when a one component non-magnetic developer (non-magnetic toner) is used, the same inconveniences arise except for the trailing due to the magnetic force.

In the foregoing, an example has been taken in which the electrostatic latent image of the negative polarity is reverse-developed with the toner charged to the negative polarity. Similar problems arise when an electrostatic latent image of the positive polarity is reverse-developed with the toner charged to the positive polarity.

Reverse-development is a development in which the toner charged to the same polarity as the polarity of the electrostatic latent image is deposited on the region having a smaller absolute value of the potential of the electrostatic latent image. Therefore, the toner is deposited on the region exposed to the image light, of the electrostatic photosensitive member, that is, the so-called light potential region.

In this Specification, the visualizing portion of the electrostatic latent image is a portion having a small absolute value of the potential of the electrostatic latent image, that is, the portion to receive the toner, whereas the background portion is a portion having a large absolute value of the potential of the electrostatic latent image, that is, the portion not to receive the toner.

SUMMARY OF THE INVENTION

Accordingly, it is a principal object of the present invention to provide a developing method and apparatus in which an oscillating bias voltage is used, and fog production is further suppressed, and in addition, edges of an image is sharp.

It is another object of the present invention to provide a developing method and apparatus in which an oscillating bias voltage is used, and fog production is further suppressed, and a trailing phenomenon is prevented, and in addition, the edge of an image is sharp, even if the electrostatic latent image is developed with magnetic toner in a magnetic field.

It is a further object of the present invention to provide a developing method and apparatus in which fog production is suppressed, and a high development density can be provided.

According to an aspect of the present invention, there is provided a developing apparatus comprising: a developer carrying member for opposing an image bearing member bearing an electrostatic image, and for a developer to develop the image on the image bearing member, the developer having a polarity which is the same as a charging polarity of the image bearing member; bias voltage applying means for applying an oscillating bias voltage to the developer carrying member, wherein the bias voltage oscillates interposing an image portion potential of the image bearing member, and an absolute value of a peak level of a background portion side potential is smaller than an absolute of a background portion potential.

According to a further aspect of the present invention, there is provided a developing apparatus comprising a developer carrying member for opposing an image bearing member bearing an electrostatic image, and for carrying a to develop the image on the image bearing member, the developer having a polarity which is the same as a charging polarity of the image bearing member, and bias voltage applying means for applying an oscillating bias voltage to the developer carrying member, wherein the bias voltage is lower than a background portion potential of the image bearing member, and a ratio of a time period in which a voltage level is beyond a center of the voltage to the background potential side is larger than 50%.

DESCRIPTION OF THE PREFERRED EMBODIMENTS

For the simplicity of explanation, the following embodiments are directed to the case in which an electrostatic latent image of the negative polarity is reverse-developed with magnetic toner charged to the negative polarity. However, the present invention is applicable to the case in which an electrostatic latent image of the positive polarity is reverse-developed with magnetic toner charged to the positive polarity. The present invention is applicable to development using non-magnetic one component developer.

Figure 4:
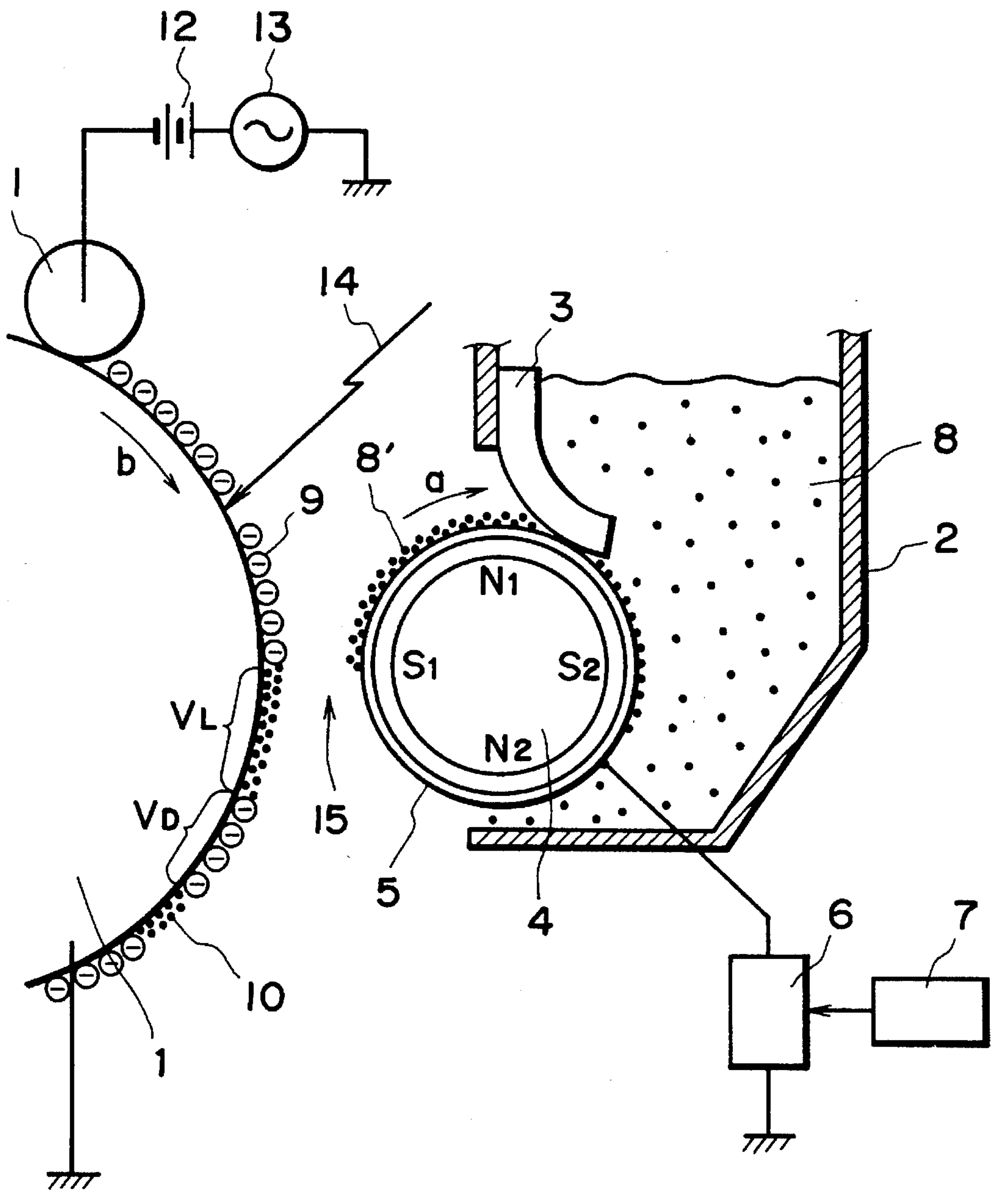
FIG. 4 is a sectional view of an exemplary developing apparatus usable with the present invention.

Referring first to FIG. 4, there is shown an example of a developing apparatus with which the present invention is usable.

As shown in FIG. 4, the developing apparatus comprises a developing sleeve 5 disposed opposed to a cylindrical electrophotographic photosensitive drum 1 in a developing zone 15 where the toner is supplied to the electrostatic latent image, and a developer regulating member 3 including an elastic blade press-contacted to the developing sleeve 5 at a side surface adjacent the free end thereof. They are disposed in a developer container 2 for containing the magnetic toner 8 which is a one component magnetic developer in this embodiment.

The developing sleeve 5 a non-magnetic and electroconductive cylinder rotatable in a direction a. In the sleeve 5, a stationary magnet 4 having magnetic poles N1, N2, S1 and S2, is disposed.

One of the magnetic poles S1 is disposed corresponding to the developing zone 15 to form a magnetic field in the zone 15. The magnetic field magnetically attracts the magnetic toner toward the sleeve 5, thus functioning to reduce fog production.

In FIG. 4, a charging bias voltage is applied to a charging roller 11 disposed on an outer peripheral surface of the electrophotographic photosensitive drum 1 rotating in a direction indicated by an arrow b from a DC high voltage source 12 and an AC high voltage source 13. In this manner, the photosensitive drum 1 is uniformly charged to a negative polarity.

The photosensitive drum 1 is scanned by a laser beam 14 modulated in accordance with an image to be recorded, so that an electrostatic latent image 9 is formed.

On the other hand, the magnetic toner 8 in the developer container 2 is deposited on a developing sleeve 5 by the magnetic force of the magnet roll 4. With the rotation of the developing sleeve 5 in a direction a, the toner 8 is conveyed while being magnetically confined on the surface of the developing sleeve 5.

When the toner passes through a nip formed between the regulating member 3 and the sleeve 5, the layer thickness of the toner is regulated, so that a thin layer of toner 8' is formed thereon. With the rotation of the sleeve 5, the thin toner layer 8' is conveyed to the developing zone 15.

The thickness of the toner thin layer 8' is smaller than the minimum clearance between the sleeve 5 and the photosensitive drum 1. Thus, so-called non-contact development is carried out in the zone 15.

The toner is triboelectrically charged to a polarity for developing the electrostatic latent image, that is, to a negative polarity in this embodiment, by rubbing with the sleeve 5 or further with the regulating member 3.

Figure 1:
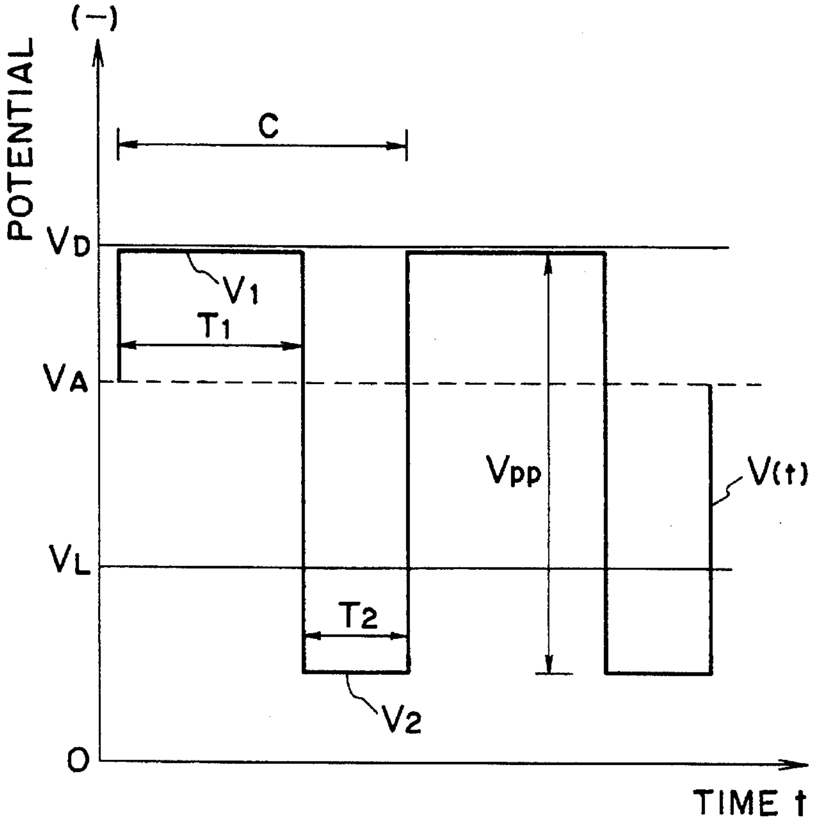
FIG. 1 is a graph illustrating an oscillating bias voltage used in a first embodiment of the present invention.

The sleeve 5 is supplied with an oscillating bias voltage V(t) shown in FIG. 1 from a voltage source 6. In this manner, in the developing zone 15, an oscillating electric field is formed between the photosensitive drum and the sleeve. The oscillating electric field is effective to vibrate the toner particles to reverse-developed the electrostatic latent image.

More particularly, the oscillating bias voltage V(t) in FIG. 1 is an oscillating bias voltage in which a first peak voltage V1 and a second peak voltage V2 alternately appear.

The first peak voltage V1 forms an electric field effective to urge the toner from the sleeve 5 toward a portion of the electrostatic latent image 9 receiving the toner (potential VL), which hereinafter will be called the "visualizing portion". In other words, the electric field applies to the toner a force in the direction from the sleeve to the visualizing portion.

The level of the voltage of the first peak voltage V1 is between the potential VL of the visualizing portion of the electrostatic latent image and the potential VD of the background portion.

The voltage level of the second peak voltage V2 is across the visualizing portion potential VL from the level of the first peak voltage V1. In other words, the visualizing portion potential VL is between the voltage level of the first peak voltage V1 of the oscillating bias voltage V(t) and the voltage level of the second peak voltage V2.

Therefore, the second peak voltage forms an electric field effective to urge the toner from the visualizing portion (VL) of the latent image toward the sleeve 5. In other words, the electric field applies to the toner a force in the direction from the visualizing portion to the sleeve.

In FIG. 1, the first peak voltage V1 lasts for the time period T1, and subsequently, the second peak voltage V2 lasts for the time period T2. This forms one cycle C of the oscillating bias voltage V(t).

In the time period T1, the toner jumps from the sleeve 5 to the visualizing portion (VL) of the latent image on the drum 1. However, the direction of the electric field in the background portion (VD) of the latent image, is reverse relative to the direction of the electric field in the visualizing portion (VL). Therefore, in the background (VD) portion, the toner charged to a negative polarity floes not jump from the sleeve 5 to the drum 1, in effect.

On the other hand, within the time period T2, a part of the toner deposited on the visualizing portion (VL) of the latent image within the time period T1 is removed from the visualizing portion (VL) and returns onto the sleeve 5.

Such motion of the toner is repeated in the developing zone 15, so that a visualized image (toner image) is formed on the drum.

In the background portion. (VD) of the electrostatic latent image, the toner does not reach the drum in the time period T1, and in addition, within the time period T2, an electric field urging the toner in the direction toward the sleeve 5 from the background portion (VD) is formed in the background portion (VD), and therefore, no fog is produced in the background portion (VD).

On the other hand, the voltage level of the first peak voltage V1 is at the visualizing potential (VL) side relative to the background portion VD, and therefore, a force attracting the toner to the visualizing portion from the neighborhood thereof is weak, and therefore, the occurrence of the abovedescribed trailing phenomenon can be prevented.

In the visualizing portion (VL), the toner repeats the deposition and departure motions, and therefore, an edge of a visualized image (toner image) faithfully corresponds to the line of the edge of the visualizing portion (VL), so that the visualized image has a sharp edge line.

In FIG. 1, the second peak voltage V2 has the same polarity as that of the electrostatic latent image, but it may be opposite. However, since the second peak voltage V2 functions to remove the toner from the visualizing portion (VL) in the time period T1, it is desirable that the voltage is selected so that all of the toner deposited on the visualizing portion (VL) is not removed. For this reason, an absolute value between the second peak voltage V2 and the visualizing portion potential VL of the latent image, that is, $|V2-VL|$, is preferably smaller than an absolute value between the first peak voltage V1 and the visualizing portion potential VL, that is, $|V1-VL|$.

In order that a sufficient amount of the toner is deposited from the sleeve 5 to the visualizing portion (VL) of the electrostatic latent image, the voltage level of the first peak voltage V1 is preferably closer to the background portion VD than the visualizing portion potential VL. Furthermore, in order to deposit a sufficient amount of toner from the sleeve 5 to the visualizing portion (VL) of the electrostatic latent image, it is preferable that the intensity of the electric field formed between the sleeve and the visualizing portion of the latent image, that is, $|V1-VL|/d$ upon the application of the first peak voltage V1 to the sleeve, is not less than 2.0 V/μm (d is the minimum gap (μm) between the sleeve 5 and the photosensitive drum 1 in the developing zone).

Figure 5:
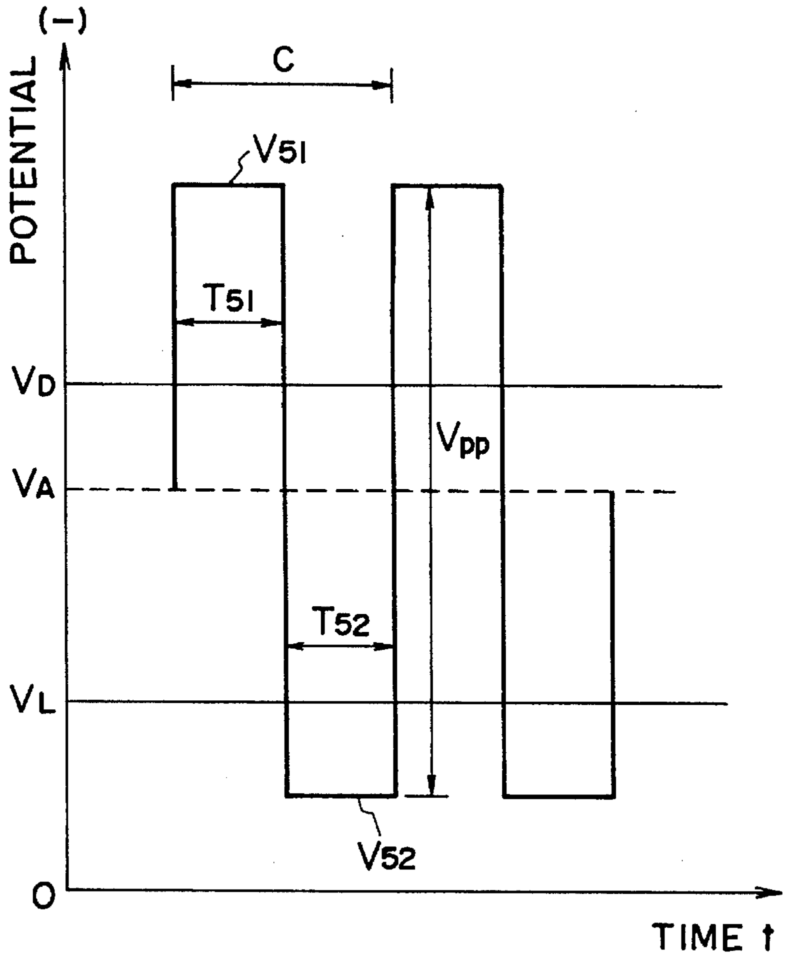
FIG. 5 illustrates a conventional oscillating bias voltage.
Figure 6:
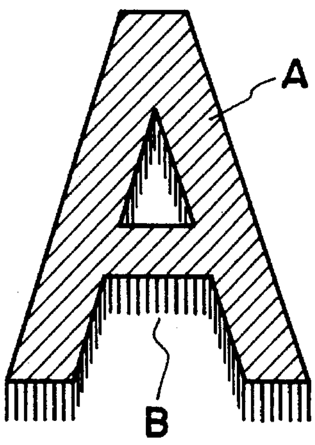
FIG. 6 illustrates a trailing phenomenon.
Figure 7A:
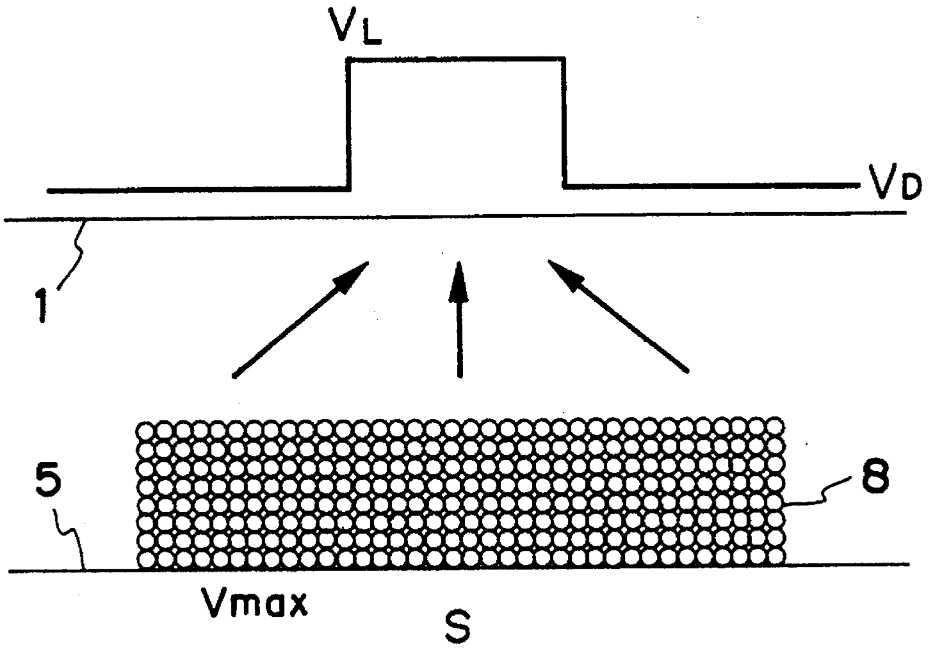
FIG. 7 illustrates a cause of the trailing phenomenon.
Figure 7B:
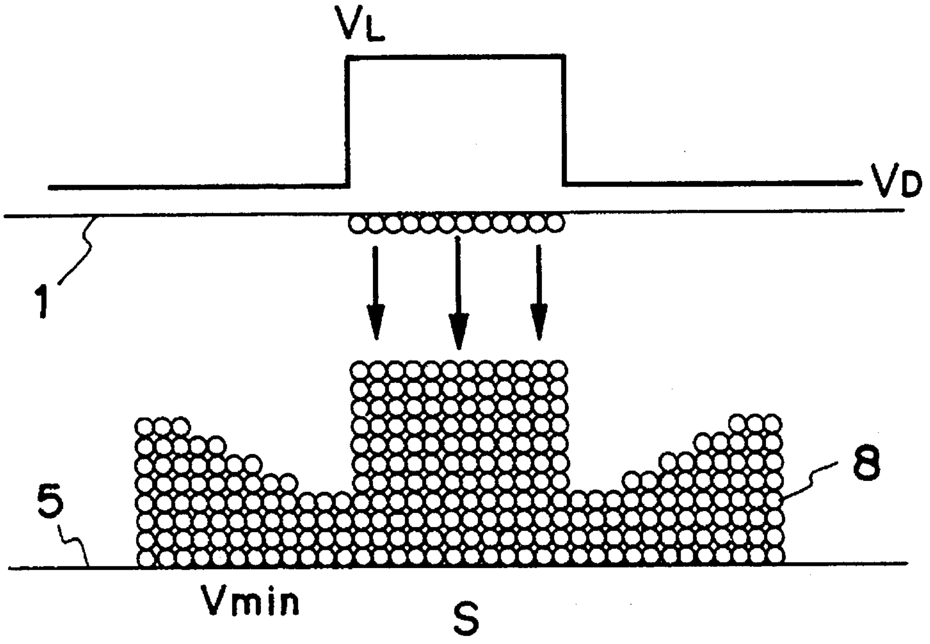
Figure 8:
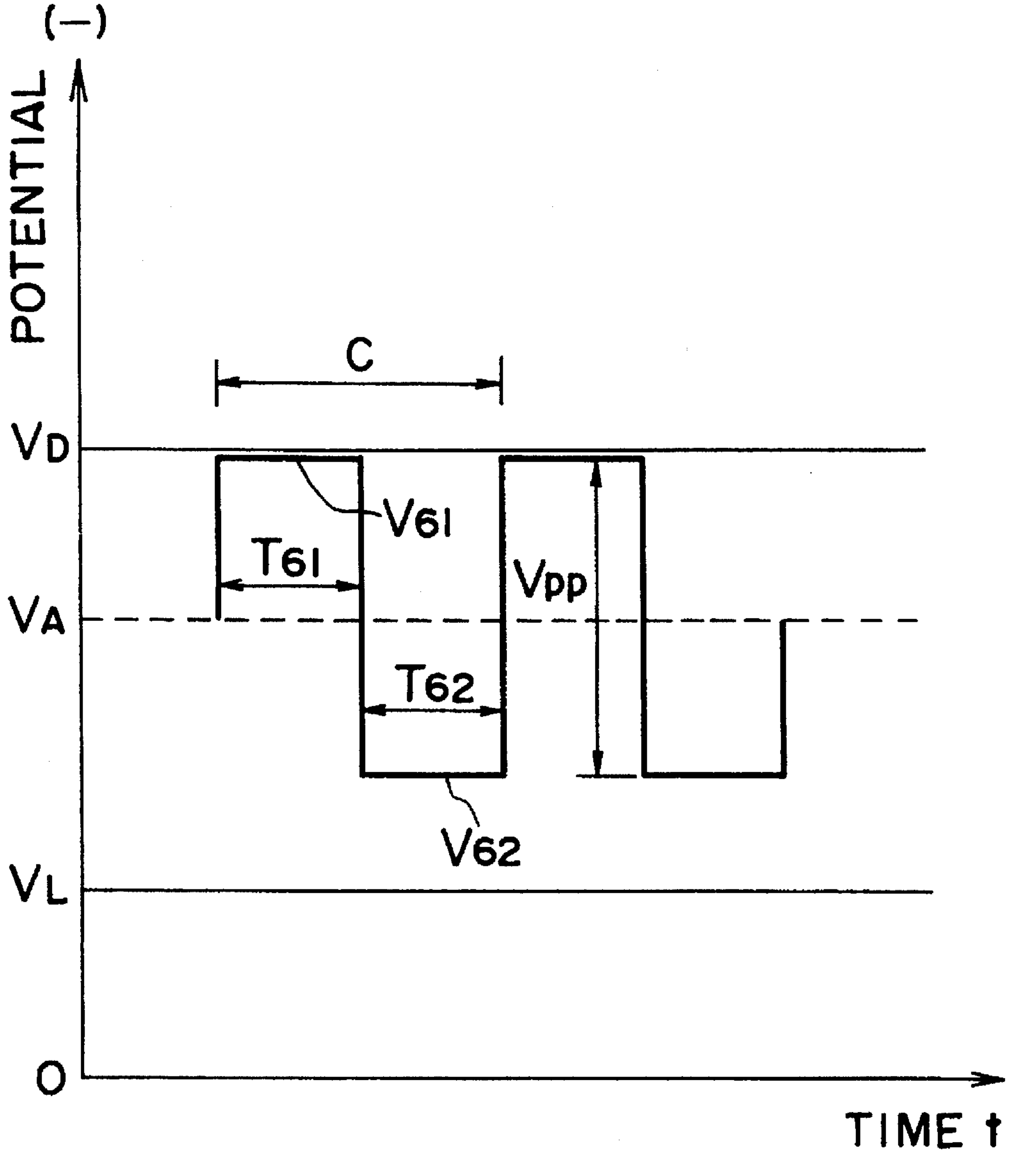
FIG. 8 is a graph illustrating another example of an oscillating bias voltage.
Figure 9:
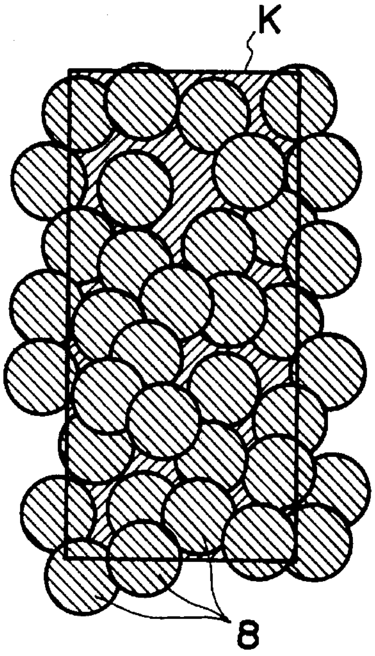
FIG. 9 illustrates unsmoothness of an edge of a toner image.
Figure 10:
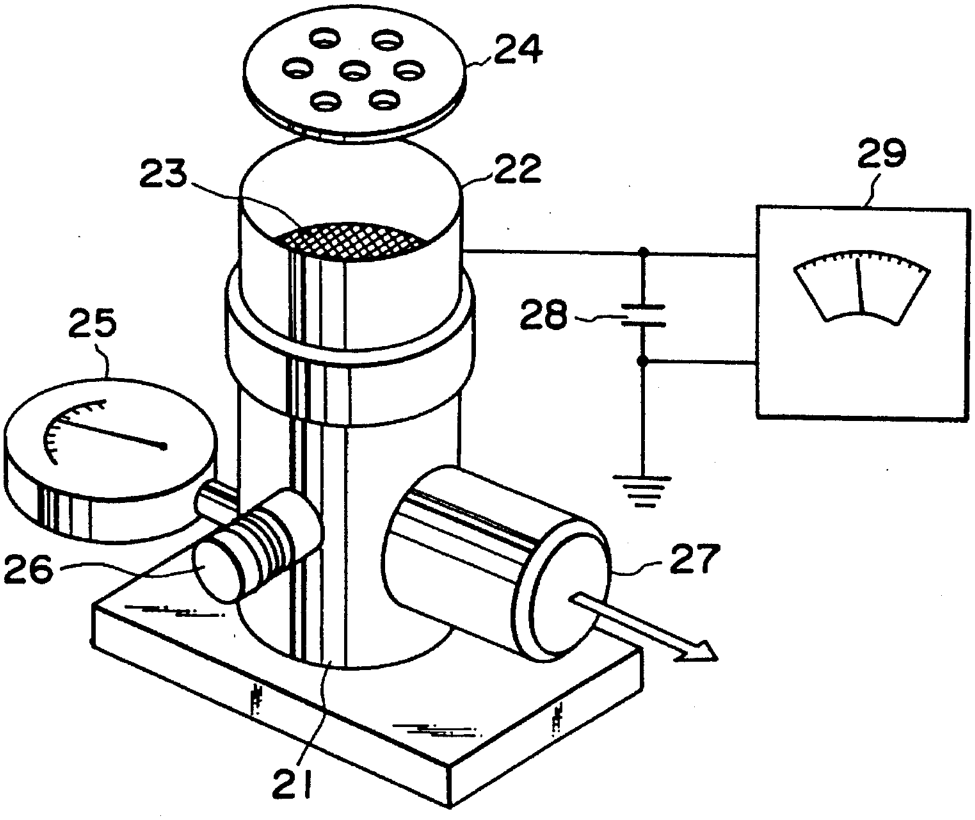
FIG. 10 illustrates a triboelectric charge amount measuring device.

In this embodiment, the electric field intensity for transferring the toner from the sleeve to the visualizing portion (VL), is smaller than that provided by the oscillating bias voltage shown in FIG. 5. In order to increase the image density of the toner image by transferring a further greater amount of the toner to the visualizing portion of the latent image and by reducing an amount of the toner removed from the visualizing portion in the time period T2, it is preferable that a ratio of the time period in which the voltage is at the background potential side beyond the center of the oscillating voltage to the time period in which the voltage is in the opposite side, which hereinafter will be called the "duty ratio", T1/T2 is preferably larger than 1. In this manner, the time spent for the toner to be deposited to the visualizing portion of the latent image is made relatively longer, and the time spent for the toner to be removed from the visualizing portion is made relatively shorter. Therefore, the density of the toner image is increased.

The duty ratio in this specification will be described in more detail.

The oscillating bias voltage V(t) which is a function of time t is integrated with time for one oscillation cycle. A value VA obtained by dividing the integration by the time T of one cycle of the oscillation is hereinafter called the "time average voltage" of the oscillating bias voltage, for convenience. In other words, $$VA = \left( \int_0^T V(t)dt \right) / T$$

Then, time length T1 is defined as a length of time in which the voltage level of the oscillating bias voltage V(t) is closer to the background potential VD than the voltage level of the time average voltage VA (first phase) in one cycle of the oscillation; and time length T2 is defined as a length of time in which it is closer to the visualizing portion potential VL (a second phase).

Then, the duty ratio is expressed as T1/T2.

In order to provide a toner image having a practically usable density, the voltage level of the time average voltage VA is set to be between the visualizing portion potential VL and the background portion potential VD of the electrostatic latent image.

A description will be made as to the actual example of various values of the first embodiment.

The electrophotographic photosensitive drum 1 is a photoconductive drum having an organic photoconductor (OPC) surface. The outer peripheral surface thereof is uniformly charged by the charging roller 11 to a negative polarity.

Thereafter, the potential of the visualizing portion is reduced by exposure with laser beam 17, so that an electrostatic latent image is formed with a visualizing portion of −150 V and a background portion of −700 V. The developing apparatus is placed in a printer in such a manner that the minimum gap between the photosensitive drum 1 and the developing sleeve 5 is 200 μm.

The magnetic flux density created by the developing magnetic pole S1 in the normal direction relative to the surface of the sleeve is 90 (mT, mili-Tesla).

The thickness of the toner layer carried on the sleeve 5 is 100 μm in the developing zone 15.

The oscillating bias voltage applied to the sleeve 5 is as follows:

V1=−690 V

V2=−90 V

Vpp= 600 V

VA= −440 V

Frequency= 1700 Hz

Duty ratio= 7/5

The composition of the magnetic toner used is as follows:

| | |
|---|---|
| Styrene-acrylic resin | 100 part by weight |
| Magnetic iron oxide | 90 part by weight |
| Low molecular weight ethylene-propylene copolymer | 4 part by weight |
| Negative charge control agent (azo dye metal complex) | 1 part by weight |

The mixture is melt-kneaded by a two-axis extruder at a temperature of 140° C., and then it is cooled down, and thereafter costly pulverized by a hammer mill. The pulverized material further is pulverized by a jet mill. Then, the material is classified using air flow to obtain black fine particles having weight average particle size (D4) of 7 μm. A mixture of 100 parts by weight of the black fine particles and 1.4 parts by weight of hydrophobic silica fine particles, was dry-mixed by Henschel mixer, thus producing the toner. The triboelectric charge of the toner was −10 μC/g.

Samples of an image produced under the conditions described above, have been checked, and it has been confirm that no trailing is formed, and that the fog is not more than 1% which is less than approx. one half the fog in the conventional developing device. The scattering (unsmoothness of the edges of the visualized image) was not more than one half of conventional scattering.

The reasons for these results are considered as follows. As to the trailing, the toner is not collected from the neighborhood, as contrasted to the conventional example, and therefore, the length of the toner chain is short, so that the trailing is avoided. As regards the fog, the toner on the developing sleeve 5 faced to the background portion of the latent image on the photosensitive drum 1 does not transfer, and therefore, for is reduced. As regards the scattering, the toner is moved to the proper position of the visualizing portion by moving once the toner at the line edge portions back to the sleeve, and therefore, the edge is clear.

In the foregoing example, the weight average particle size of the toner is 7 μm. The present invention is particularly applicable to toner having an average particle size of 4–10 μm. However, the present invention is not limited to this.

The weight average particle size of the toner is determined in the following manner.

Coulter counter Model TA-II (available from Coulter Electronics Inc.) is used, to which an interface (available from Nikkaki K.K.) for providing a number-basis distribution, and a volume-basis distribution and a personal computer CX-1 (available from Canon K.K.) are connected.

For measurement, a 1%-NaCl aqueous solution as an electrolytic solution is prepared by using a first class sodium chloride. Into 100 to 150 ml of the electrolytic solution, 0.1 to 5 ml of a surfactant, preferably an alkylbenzenesulfonic acid salt, is added as a dispersant, and 2 to 20 mg, of a sample approx. 30,000–300,000 particles) is added thereto.. The resultant dispersion of the same in the electrolytic liquid is subjected to a dispersion treatment for about 1–3 minutes by means of an ultrasonic disperser, and then subjected to measurement of particle size distribution in the range of 2–40 μm by using the above-mentioned Coulter current Model TA-II with a 100 μm-aperture to obtain a number-basis distribution. From the results of the distribution, weight average particle size is determined.

Figure 2:
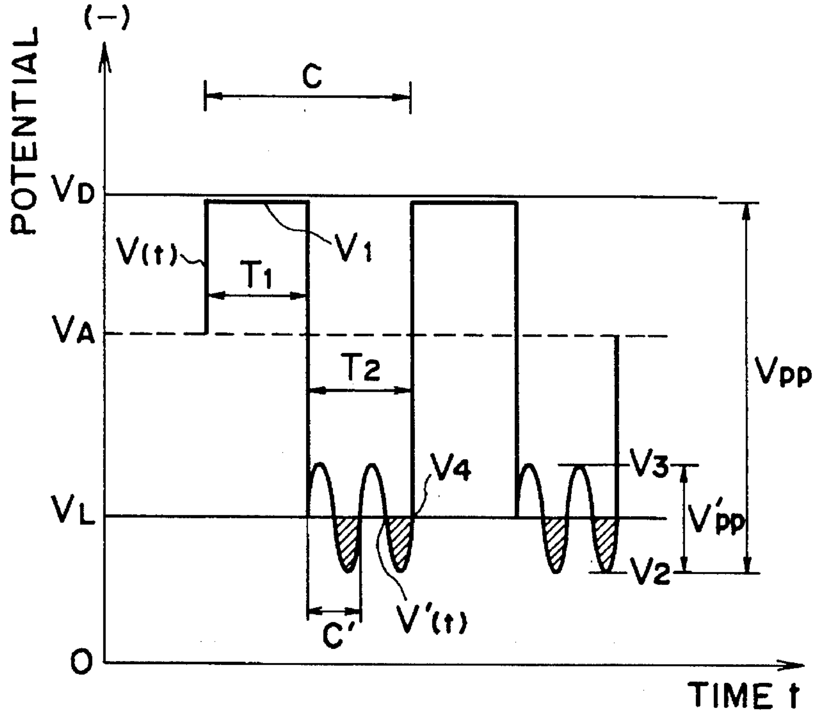
FIG. 2 is a graph illustrating an oscillating bias voltage used in a second embodiment of the present invention.

Referring to FIG. 2, a second embodiment will be described.

An oscillating bias voltage of FIG. 2 is applied to sleeve 5.

The oscillating bias voltage V(t) of FIG. 2, the first peak voltage V1 is similar to that of FIG. 1.

On the other hand, in the phase in the time period T2, the voltage V' oscillates with a period C' with the voltage V4 at the center. The length of the period C' is smaller than the length of the period C. The peak-to-peak voltage V'pp of the voltage V'(t) oscillating with the period of C' is smaller than the peak-to-peak voltage Vpp of the oscillating voltage V(t).

From the foregoing, a plurality of the second peak voltage V2 (2 times in FIG. 2) appears in one phase of the time period T2. A part of the toner deposited on the visualizing portion (VL) of the electrostatic latent image is removed toward the sleeve in the phase by the hatched lines in the Figure. Within one time period T2, it receives a removing force a plurality of times, and therefore, the oscillating motion of the toner is activated, and therefore, the sharpness of the edge of the image is further improved.

In the toner a small amount of abnormal toner which is charged to a polarity opposite from that of the normal toner occurs in some cases. The abnormal toner is charged to a positive polarity in this embodiment. In such a case, the abnormal toner is deposited to the background portion (VD) of the latent image by the electric field formed by the second peak voltage V2 with the result of slight degree of fog. However, in the oscillating bias voltage of FIG. 2, the second peak voltage V2 appears only for a short period of time in the phase of time T2, and therefore, the fog due to the abnormal toner can be further reduced.

In FIG. 2, the center voltage V4 of the high frequency oscillating voltage V'(t) is the same as the visualizing portion potential. VL of the electrostatic latent image. However, the center potential may be higher or lower than the potential VL. However, it is preferable that the voltage V4 is shifted toward the background portion potential VD beyond the visualizing potential VL, from the standpoint of further reducing the fog due to the abnormal toner.

An example of the specific values used in the second embodiment will be described.

The electrostatic latent image has a background portion potential VD of −700 V and a visualizing portion potential of −150 V, as in the foregoing embodiment.

The first peak voltage V1 of the oscillating bias voltage V(t) is −690 V; a second peak voltage V2 is −100 V; the frequency (1/C) is 1000 Hz. The high frequency voltage V'(t) has the central voltage V4 of −150 V, a frequency (1/C') of 4000 Hz, and a peak-to-voltage V'pp of 100 V. The minimum gap between the drum 1 and the sleeve 5 is 150 μm.

In such an example, a clear developed image without fog or tailing and with a sharp edge can be produced.

As a method of controlling the image density of the toner image, there are known a method in which the waveform of the oscillating bias voltage is shifted up or down in parallel or a method in which the peak-to-peak voltage is changed. However, with these methods, the fog density increases with an increase in the image density, and also the tailing and the unsmoothness of the image edge become remarkable.

A third embodiment which will be described below is intended to avoid these inconveniences, and the toner image density can be controlled.

Referring to FIG. 4, reference numeral 7 designates a duty ratio controlling device for automatically changing the duty ratio of the oscillating bias voltage applied to the sleeve 5 in accordance with the signal from an original image density detecting device or by manual operation by an operator.

Figure 3A:
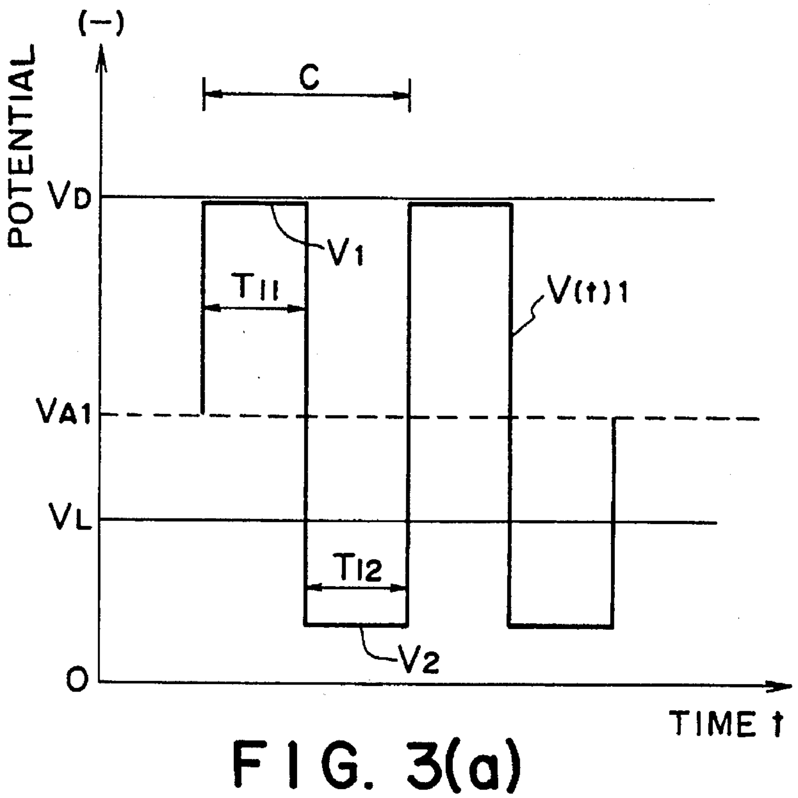
FIGS. 3 (*a*) and 3 (*b*) are graphs illustrating an oscillating bias voltage used in a third embodiment of the present invention.
Figure 3B:
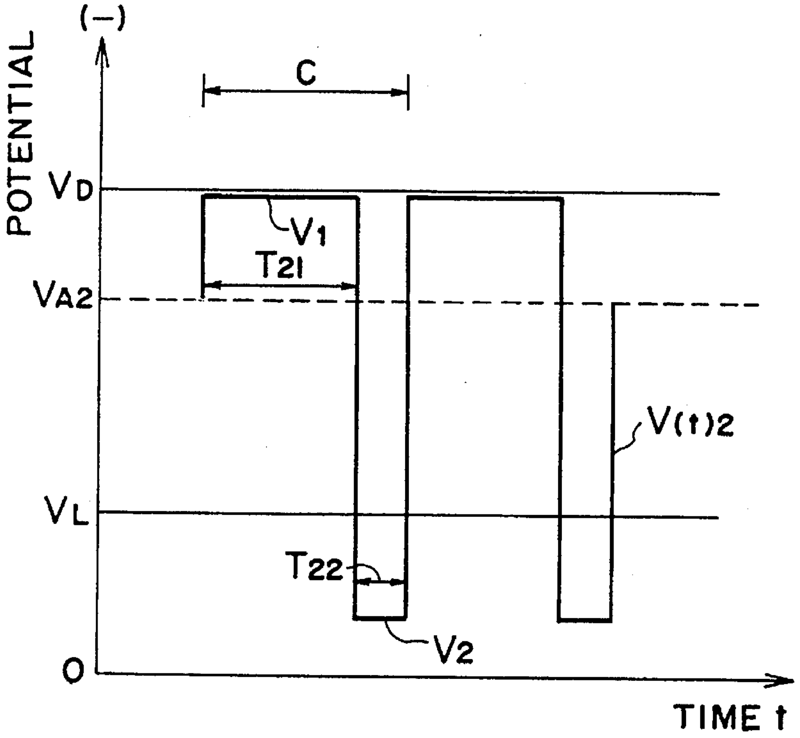

For example, in order to obtain a relatively low density toner image, the controlling device 7 is manipulated to apply an oscillating bias voltage V(t)1 shown in FIG. 3 (*a*) to the sleeve 5. In order to obtain a relatively high density toner image, the control device 7 is manipulated to apply to the sleeve 5 the oscillating bias voltage V(t)2 shown in FIG. 3 (*b*).

As will be understood from FIGS. 3(*a*) and (*b*), the duty ratio is changed with the first peak voltage V1, the second peak voltage V2 and the oscillating period C (and therefore, the oscillation frequency 1/C) of the oscillating bias voltage is maintained constant.

In FIG. 3(*a*) the duty ratio T11/T12 is 1, and in FIG. 3(*b*), the duty ratio T21/T22 is 3.

When the duty ratio is changed, the time average voltage of the oscillating bias voltage changes, as will be understood from FIGS. 3(*a*) and (*b*). The time average voltage is VA1 and VA2 in FIG. 3(*a*) and (*b*), respectively. It will be thus understood that the density of the toner image increases with the difference of the time average voltage of the oscillating bias voltage from the visualizing portion potential VL of the latent image.

An example of the specific values used in the third embodiment will be described.

The electrostatic latent image has a visualizing portion potential VL of −700 V and a background portion potential VA of −150 V.

The minimum clearance between the sleeve 5 and the drum 1 is 200 μm.

The first peak voltage V1 of the oscillating bias voltages V(t)1 and V(t)2 is −690 V; the second peak voltage V2 is −90 V; the frequency is 1000 Hz; and the oscillating period C is 1 msec.

The duty ratio of the oscillating bias voltage V(t)1 is 1; the time average voltage VA1 is −390 V; the duty ratio of the oscillating bias voltage V(t)2 is 3: and the time average voltage VA2 is −540 V.

In this manner, the image density of the toner image could be controlled while preventing fog, tailing and scattering of the toner at the edge of the toner image.

In the foregoing embodiments, the oscillating bias voltage has a waveform of a rectangular wave, but a curved wave similar to a sine wave or a rectangular wave can be used.

A description will be made as to the developer usable with the foregoing embodiments.

In the case of a one component developer, the developing system does not require carrier particles such as glass beads or iron powders: as in the two component developer developing system, and therefore, the size and weight of the developing device itself can be reduced. In the case of the two component developer developing system, the necessity arises for maintaining a constant content of the toner in the carrier, and therefore, it is required to detect the toner content and to supply a necessary amount of the toner. Therefore, the developing device becomes large and heavy. In the one component developer system, these means are not required, and therefore, the size and the weight can be reduced.

In the case of a copying machine, the demand is directed to increasing the speed and increasing the stability. Particularly, in intermediate and high speed machines, the two component developer system is mainly used. This is because the stability of the copied image against the high speed and long term use is more important than the size or weight of the developing apparatus in such considerably large machines. Generally speaking, the toner used in the two component developer is colored with carbon black or the like, and the remainder is occupied mostly by binder resin material.

For this reason, the toner particles are light in weight, and do not have sufficient force for attracting carrier particles other than the electrostatic force. Therefore, in the high speed development operation, the toner scattering tends to occur with the result that the optical lens, the original supporting platen glass, the sheet conveying portions or the like are contaminated in a long term use. These circumstances would results in instability of the copied image. In consideration of these facts, a developing method has been put into practice wherein magnetic material is contained in the toner to increase the weight and to cause the toner to cling to the magnetic carrier particles by a magnetic force other than the electrostatic force, thus preventing toner scattering. For these reasons, the image forming method using the one component magnetic developer becomes more significant.

In the commercial market of printers, LED or LBP printers are dominant, and the demands are directed to a higher resolution, more particularly from conventional 240 or 300 dpi to 400 dpi, 600 dpi or 800 dpi. With the these demands, the developing system is required to develop finer images. In addition, higher functions of the copying machines are desired, and therefore, digital copying machines are increasing. In this case, an electrostatic latent image is formed using a laser beam, and the demand is directed for high resolution. Similarly to the printer, the high resolution and finer developing method are desired. Small particle size toners have been proposed in Japanese Laid-Open Patent Application No. 112253/1989, Japanese Laid-Open Patent Application Publication No. 284158/1990 or the like.

However, where the weight average particle size of the toner is small fine particles (generally not more than 9 μm), charged up toner particles or fine particles are strongly deposited on the electrostatic latent image bearing member by mirror force or the like with the result of difficulty in returning the toner from the non-image portion of the latent image by the electric field or magnetic field forces. These toner particles are transferred onto the transfer material with the result of foggy background, thus deteriorating the image quality.

In addition, a primary charging operation or image transfer operation using a charging roller, become used. More particularly, a charging member in the form of an electroconductive roller is supplied with a voltage, and the roller is contacted to the photosensitive member (the member to be charged) to charge the surface thereof to a predetermined potential. For example, in Japanese Patent Application Publication No. 13661/1975, a roller comprises a core metal and nylon or polyurethane rubber dielectric material thereon. In this manner, the voltage required is low when the photosensitive member is charged.

Japanese Laid-Open Patent Application No. 46664/1984 discloses an electrostatic charge image bearing member that is in the form of a rotatable cylinder, an endless belt or another member movable along an endless path, and a transfer device supplied with a bias voltage is press-contacted thereto, and a transfer material is passed through between them, by which the developed image is transferred onto the transfer material from the electrostatic charge image bearing member.

However, in such a transfer system not using a corona discharge, the transfer material is contacted to the photosensitive member during the image transfer operation, and therefore, the developed image is pressed when the developed image is transferred from the photosensitive member to the transfer material, with the result of local improper transfer (transfer void).

According to an aspect of the present invention, $$100 \geqq |Qd| \geqq 40\ \mu C/g$$

where Qd is the triboelectric charge relative to iron powder of the developer. This is a one component magnetic developer.

According to an additional aspect, the developer carrying member is coated with a resin layer comprising electrically conductive fine particles, and $$15 \geqq |Qd|/|Qm| \geqq 2.5, \text{ preferably}$$

$$14 \geqq |Qd|/|Qm| \geqq 3$$

where Qm the triboelectric charge using an attracting method on the developer carrying member.

According to the above, the relationship between the developing bias applied to the developer carrying member and the potential on the electrostatic latent image bearing member is such that only the image portion of the latent image is visualized in the development promoting phase of the developing bias voltage and that the developer of the image and the non-image portion of the latent image bearing member is returned in the returning phase of the developing bias voltage and that the development contrast for sufficiently depositing the developer to the image portion of the latent image, can be provided.

By the use of the magnetic developer and the image forming apparatus using the same, wherein $100 \geqq |Qd| > 40$ μC/g and/or $15 \geqq |Qd|/|Qm| \geqq 2.5$:

(1) The developer particles are moved from the developer carrying member faithfully to the electrostatic latent image on the latent image bearing member in a proper amount (not smaller or not larger than the optimum); and (2) In the transfer position where three elements, i.e., the transfer member, magnetic developer, and the electrostatic latent image bearing member, are present, the electrostatic attraction forces among the three elements are balanced well.

Thus, the fog, and the reverse fog, which are the problems with the conventional system when fine developer particles are used, are practically prevented. In addition, the toner scattering is prevented. In the case of the copying process not using a corona charger, high resolution and fine images can be provided without the transfer void or with a limited transfer void.

In this aspect of the present invention, when |Qd| exceeds 100 μC/g, the image density tends to lower in the case of continuous copying or printing. When |Qd| is less than 40 μC/g, or |Qd|/|Qm| is larger than 15 or less than 2.5, the above-described advantages (1) and (2) are not provided with the result of development efficiency decreases, and therefore, the transfer void tends to occur.

The electric field between the developer carrying member and the image portion of the latent image is preferably 2.0 V/μm. If it is smaller than 2.0 V/μm, then the toner transferring force is not sufficient, and therefore, the image density of the developed image is not sufficient.

The above-described advantages using the magnetic developer of this aspect of the invention, are particularly significant in the case of a combination of a latent image bearing member having a radius of curvature not more than 50 mm, a developer carrying member having a radius of curvature not more than 20 mm and a transfer member having a radius of curvature not more than 30 mm. The reason is considered as being that the nature of the developer significantly influences the developing and transferring operations as a result of narrowed developing zone and transfer zone.

The fine magnetic particles contained in the developer are a material magnetizable in a magnetic field. Examples of usable materials include ferromagnetic metal powders of iron, cobalt, nickel or the like, or alloy or chemical compound such as magnet, gamma-$Fe_2O_3$, ferrite or the like. The saturated magnetization as of the magnetic particles is 50–100 emu/g, particularly 60–80 emu/g under 1 Oersted. The BET specific surface area (nitrogen absorption method) is preferably 1–20 $m^2/g$, further preferably 2.5×12 $m^2/g$. Furthermore, Mose hardness is preferably 5–7 (magnetic particle).

The content of the magnetic material is 5–60 parts by weight on the basis of 100 parts of the binder resin, further preferably it is 15–40 parts by weight. If it is smaller than 5 parts, then the conveying property is insufficient with the tendency of non-uniformity of the image because of the non-uniformity of the developer layer on the developer carrying member. If it is larger than 60 parts, then the transfer void tends to occur.

For example, reduction of the content of the magnetic material is effective to decrease the magnetic property per one developer particle, thereby to reduce the height of the chains of the developer on the developer carrying member. In this manner, the trailing or scattering around a character image can be reduced. The development efficiency is also increased. However, by reducing the magnetic property, the force for returning the developer onto the developer carrying member is weakened, and therefore, the developer is deposited on the non-image portion with the result of a tendency of fog occurrence. Therefore, the motion of the developer between the developer carrying member and the electrostatic latent image carrying member (S-D gap) is desirably controlled on the basis of the S-D gap or the bias voltage conditions (wave form) duty or the like. Particularly in the case of small size developer (approx. 4–9 μm in the weight average particle size), the developer tends to transfer in the form of a group of developer particles. In consideration of this, the developing bias is selected so that the transfer motion of the developer to the non-image portion is suppressed. The developing condition in this embodiment is selected so that the transfer force to the non-image portion is not applied but the transfer force to the image portion is sufficient. To further improve the edges of the character image, it is preferable that a slight degree of returning force is applied to the image portion by an alternating electric field.

The weight average particle size of the developer in this embodiment is 4–10 μm, particularly 4.5–9 μm. Satisfactory results were obtained with these size. If the particle size is smaller than 4 μm, then the developer is remarkably agglomerated with the result of difficulty in handling the developer. If it exceeds 10 μm, then the reproducibility of dot latent images and fine lines of 100 μm or less is not satisfactory.

The surface roughness of the image bearing member in this embodiment is preferably 0.2–1.5 μm (JIS center line average roughness (Ra)). If the roughness Ra is smaller than 0.2 μm, then the charge amount Qm on the developer carrying member is too high with the result of insufficient development. If the roughness Ra exceeds 1.5 μm, then the coating layer of the developer of the image bearing member becomes non-uniform with the result of density non-uniformity in the resultant image. Electrically conductive fine particles contained in the resin layer covering the surface of the image bearing member may be one, two or more of a conductive metal oxide or metal double oxide, such as carbon black, graphite, conductive zinc oxide or the like. The conductive fine particles are dispersed in a resin material such as phenol resin, epoxy resin, polyamide resin, polyester resin, polycarbonate resin, polyolefin resin, silicone resin, fluorine resin, Styrene resin, acrylic resin or another known resin material. Preferably, the material exhibits a thermo-curing or photo-curing nature.

From the standpoint of uniform charging of the developer, the developer is preferably regulated by an elastic member contacted to the developer carrying member.

Referring to FIG. 15, a method of measuring Qd using a triboelectric charge measuring device, will be described.

EFV 200/300 (available from POWDER TEC) is used. Under the condition of 23° C. and 60% of relative humidity, 9.5 g of carrier and 0.5 g of developer were mixed in a polyethylene container having a volume capacity of 50–100 ml, and the container was manually vibrated 50 times.

Subsequently, 1.0–1.2 g of the mixture was supplied to a measuring container 22 of metal having a screen 23 of 500 mesh at the bottom. Then, the container was capped with a metal cap 24. The total weight of the container was measured (W1 (g)). A sucking machine 21 (at least a portion thereof contacting the measuring container 22 is made of insulating material) was used to suck through the sucking port 27, while controlling the pressure detected by a vacuum gauge 25 by a flow controlling valve 26 at 250 mm aq. The sucking operation was continued in this state for one minute so that the developer was sucked and removed. The potential indicated by a potentiometer 25 was V (volt). Designated by a reference numeral 28 is a capacitor having a capacitance C (μF). The weight of the entire measuring container after the sucking operation was measured (W2 (g)). Then, the triboelectric charge Qd (μC/g) of the developer was calculated as follows:

$$Qd=(CV)/(W1-W2)$$

As for the measurement of Qm, a measuring container having a cylindrical filter paper was used in place of the 500 mesh screen. In place of the metal cap 24, a metal sucking port device compatible with the configuration of the surface of the developer carrying member, was mounted. The sucking pressure was adjusted such that the developer layer on the developer carrying member surface immediately after the image formation (preferably within 5 minutes) could be uniformly sucked, and then, the weight of the developer sucked was M(g), and Qm was calculated as follows:

$$Qm=CV/m$$

Examples of usable binder resin materials may include: homopolymers of styrene and its derivatives, such as polystyrene, poly-p-chlorostyrene, and polyvinyltoluene; styrene copolymers, such as styrene-p-chlorostyrene copolymers, styrene-vinyltoluene copolymer, styrene-vinylnaphthalene copolymer, styrene-acrylate copolymer, styrene-methacrylate copolymer, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, and styrene-acrylonitrileindene copolymer; polyvinyl chloride, phenolic resin, natural resin-modified phenolic resin, natural resin-modified maleic acid resin, acrylic resin methacrylic resin, polyvinyl acetate, silicone resin, polyester resin, polyurethane, polyamide resin, furan resin, epoxy resin, xylene resin, polyvinylbutyral, terpene resin, coumarone-indene resin and petroleum resin. Additionally, bridged styrene resin is preferable.

Examples of comonomers to form such a styrene copolymer may include one or more vinyl monomers selected from: monocarboxylic acid having a double bond and their substituted derivatives, such as acrylic acid, methyl acrylate, ethyl acrylate, butyl acrylate, dodecyl acrylate, octyl acrylate, 2-ethylhexyl acrylate, phenyl acrylate, methacrylic acid, methyl methacrylate, ethyl methacrylate, butyl methacrylate, octyl methacrylate, acrylonitrile, methacrylonitrile, and acrylamide; dicarboxylic acids having a double bond and their substituted derivatives, such as maleic acid, butyl maleate, methyl maleate, and dimethyl maleate; vinyl esters, such as vinyl chloride, vinyl acetate, and vinyl benzoate; ethylenic olefins, such as ethylene, propylene, and butylene; vinyl ketones, such as vinyl methyl ketone, and vinyl hexyl ketone; vinyl ethers, such as vinyl methyl ether, vinyl ethyl ether, and vinyl isobutyl ethers. As the crosslinking agent, a compound having two or more polymerizable double bonds may principally be used. Examples thereof include: aromatic divinyl compounds, such as divinylbenzene, and divinylnaphthalene; carboxylic acid esters having two double bonds, such as ethylene glycol diacrylate, ethylene glycol dimethacrylate, and 1,3-butanediol diacrylate; divinyl compounds such as divinyl ether, divinyl sulfide and divinyl sulfone; and compounds having three or more vinyl groups. These compounds may be used singly or in mixture.

In the magnetic toner of the present invention, it is preferred that a charge controller may be incorporated in the toner particles (internal addition), or may be mixed with the toner particles (external addition). By using the charge controller, it is possible to most suitably control the charge amount corresponding to a developing system to be used. Particularly, in the present invention, it is possible to further stabilize the balance between the particle size distribution and the charge.

Examples of the negative charge controllers include an organic metal complex and a chelate compound, more particularly, monoazo metal complex, acetylacetone complex, aromatic hydroxycarboxylic acid type and aromatic dicarboxylic acid type metal complex. In addition, there are aromatic hydroxycarboxylic acid, aromatic mono- or polycarboxylic acid, a metallic salt thereof anhyd, ester, bisphenol or other plural derivative.

Examples of the positive charge controller may include: nigrosine and its modification products modified by a fatty acid metal salt; quaternary ammonium salts, such as tributylbenzyl-ammonium-1 hydroxy-4-naphthosulfonic acid salt, and tetrabutylammonium tetrafluoroborate; diorganotin oxides, such as dibutyltin oxide, dioctyltin oxide, and dicyclohexyltin oxide; and diorganotin borates, such as dibutyltin borate, dioctyltin borate, and dicyclo-hexyltin borate. These positive charge controllers may be used singly or as a mixture of two or more species. Among these, a nigrosine-type charge controller or a quaternary ammonium salt charge controller may particularly preferably be used.

As another type of positive charge controller, there may be used a homopolymer of a monomer having an amino group represents by the formula:

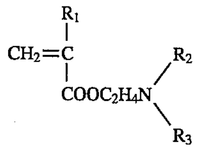

wherein $R_1$ represents H or $CH_3$; and $R_2$ and $R_3$ each represent a substituted or unsubstituted alkyl group (preferably $C_1$–$C_4$); or a copolymer of the monomer having an amine group with another polymerizable monomer such as styrene, acrylates, and methacrylates as described above. In this case, the positive charge controller also has a function of a binder.

It is preferred that the above-mentioned charge controller is used in the form of fine powder. In such a case, the number-average particle size thereof may preferably be 4 microns or smaller, and more preferably 3 microns or smaller.

In the case of internal addition, such charge controller may preferably be used in an amount of 0.1 –20 wt. parts, and further preferably 0.2–10 wt. parts, per 100 wt. parts of the binder resin.

The coloring material which can be added to the toner includes known carbon black, copper phthalocyanine.

It is preferred that silica fine powder is added to the magnetic toner of the present invention. The silica powder may be one produced through the dry process, that is, vapor phase oxidation of silicon halide or dry silica called humid silica, or wet silica made from water glass or the like. However, the dry silica is preferable since the amount of silanol group on the surface or inside of the particle is small and since the manufacture of residual such as $Na_2O$, $Si_3^{2-}$ or the like is not produced.

In the preparation step, it is also possible to obtain a complex fine powder or silica and other metal oxides by using other metal halide compounds such as aluminum chloride or titanium chloride together with silicon halide compounds. Such is also included in the fine silica powder to be used in the present invention. The average primary particle size is preferably 0.001–2 μm, and further preferably 0.002–0.2 μm. For treatment for hydrophobic property, known silane coupling material or silicone oil is usable.

The developer may be added with another additive or additives such as fixing assisting agent (low molecular weight polyethylene or the like), or tin oxide or another metal oxide as conductivity imposing material.

The weight average particle size (D4) can be measured through various methods. In this invention, a Coulter counter is used.

Coulter counter Model TA-II (available from Counter Electronics Inc.) is used as an instrument for measurement, to which an interface (available from Nikkaki K.K.) for providing a number-basis distribution, and a volume-basis distribution and a personal computer CX-1 (available from Canon K.K.) are connected.

For measurement, a 1%-NaCl aqueous solution as an electrolytic solution was prepared by using a reagent-grade sodium chloride. Into 100 to 150 ml of the electrolytic solution, 0.1 to 5 ml of a surfactant, preferably an alkylbenzenesulfonic acid salt, was added as a dispersant, and 2 to 20 mg, of a sample was added thereto. The resultant dispersion of the sample in the electrolytic liquid was subjected to a dispersion treatment for about 1–3 minutes by means of an ultrasonic disperser, and then subjected to measurement of particle size distribution in the range of 2–40 microns using the above-mentioned Coulter counter Model TA-II with a 100 micron-aperture to obtain a volume-basis distribution and a number-basis distribution. A weight average particle size (D4) (centers of the respective channels are used as representatives) on the basis of the weight was obtained from the volume distribution.

The manufacturing methods for the developer may include a method including a kneading step using a heat roll, kneader, extruder or the like and a mechanical pulverizer and a classifier, a method including dispersion of the material in resin liquid and atomizing and drying step, and a method including mixing the material and binder resin into an emulsion and polymerization.

Figure 11:
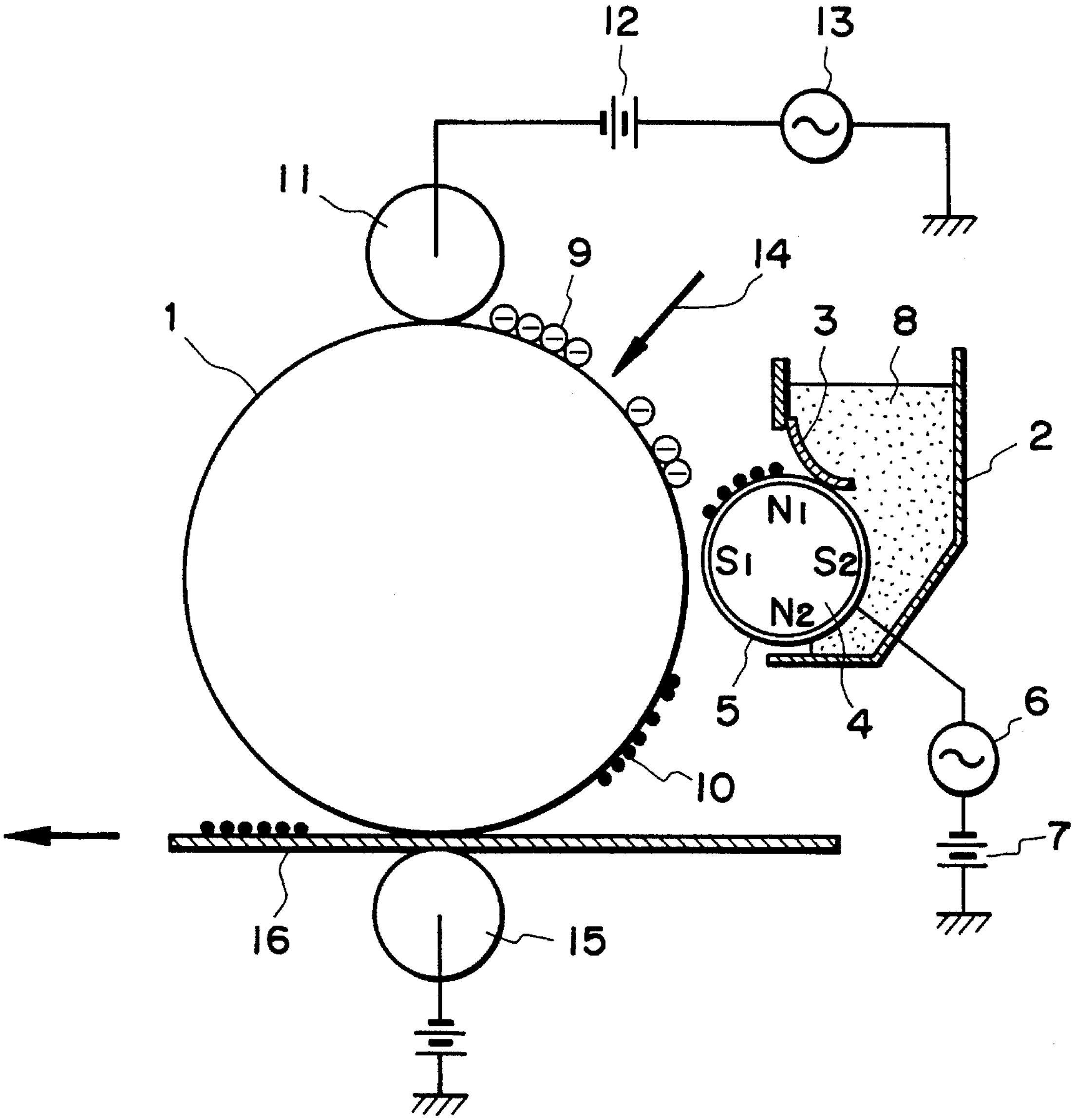
FIG. 11 is a sectional view of an example of an image forming apparatus usable with the present invention.

FIG. 11 illustrates an example of an image forming apparatus according to an embodiment of the present invention. In FIG. 11, a developer carrying member 5 is disposed opposed to an electrostatic latent image bearing member 1, and to the developer carrying member a developer regulating member 3 is press-contacted. They are disposed in a developing device 2 for containing the magnetic developer. The developer bearing member 5 is connected with an alternating high voltage source 6 and a DC high voltage source 7 to be supplied with a developing bias voltage. The developer carrying member 5 comprises a stationary magnet roll 4 magnetized to have a plurality of magnetic poles (N1, S1, N2, S2) having different polarities and magnetic forces, and a cylindrical developing sleeve rotatable around the magnet roll 4. With the rotation of the developing sleeve, the attraction and conveyance of the magnetic developer 8 and formation of the developer layer and the returning of the fog toner, are carried out. A charging bias voltage is applied to a charging roller 11 contacted to the outer periphery of the latent image bearing member 1 from a high voltage DC source 12 and a high voltage AC source 13, so that the latent image bearing member 1 is charged. Subsequently, it is exposed to a laser beam 14 so that an electrostatic latent image 9 is formed. The latent image is reverse-developed by magnetic developer 8.

The visualized image 10 on the image bearing member is transferred onto a transfer material 16 by a transfer roller 15, and is fixed by an unshown fixing device. Developer remaining on the latent image bearing member is removed by a cleaning means.

[Examples]

Examples of manufacturing methods will be described, although they do not limit the present invention.

In the following formulations, contents are all expressed by parts by weight.

EXAMPLE 1

| | |
|---|---|
| Styrene-n-butyl acrylate copolymer (copolymerization wt. ratio = 8:2 Mw = 260,000) | 10 parts |
| Magnetic iron oxide (BET = 6.5 $m^2/g$, σs = 65.6 emu/g) | 30 parts |
| Negative charge controller (monoazo dye iron complex) | 2 parts |
| Ethylene-propylene copolymer (Mw = 6000) | 3 parts |

The mixture is melt-kneaded at 140° C. by two-axis extruder. After cooling, it is coarsely pulverized by a hammer mill, and is finely pulverized by a jet mill. The products are classified by air blow to provide negative chargeable magnetic toner. 0.8 part of hydrophobic silica fine particles (BET=200 $m^2/g$, treated with hexamethyldisilazane) is added to 100 parts of the toner. This is mixed by a Henschel mixer, thereby providing a developer (1). |Qd| of this developer was 62.5 μC/g.

EXAMPLE 2

| | |
|---|---|
| Styrene-2-ethylhexylacrylate-maleic-acid n-butylhalfester copolymer (copolymerization wt. ratio = 7:2:1, Mw = 220,000) | 100 parts |
| Magnetic iron oxide (BET = 6.5 $m^2/g$, σs = 65.6 emu/g) | 40 parts |
| Negative charge controller (monoazo dye chromium complex) | 0.5 part |
| Low molecular weight polypropylene (Mw = 6000) | 3 parts |

Through the same process as in Example 1, negative chargeable magnetic toner with weight average particle size (D4) of 5.5 μm was provided. 1.5 parts of polydimethylsiloxane-treated hydrophobic silica fine particles (BET 250 $m^2/g$) was added to 100 parts of the toner, and they were mixed by a Henschel mixer, thus providing a developer (2). |Qd| of this developer was 77.5 μC/g.

EXAMPLE 3

| | |
|---|---|
| Styrene-n-butylacrylate (copolymerization wt. ratio = 7.5:2.5 Mw = 290,000) | 100 parts |
| Magnetic iron oxide ($BET = 5.5\ m^2/g$, $\sigma s = 68.5$ emu/g) | 15 parts |
| Negative charge controller (monoazo dye iron complex) | 2 parts |
| Ethylene-propylene copolymer (Mw = 4000) | 6 parts |
| Carbon black | 5 parts |

Through the same process as in Example 1, negative chargeable magnetic toner with weight average particle size (D4) of 7,5 μm was provided. 1.0 part of hydrophobic silica fine particles (BET= 200 $m^2$/g, treated with hexamethyldisilazane) was added to 100 parts of the toner. This was mixed by a Henschel mixer, thereby providing a developer (3). |Qd| of this developer was 94.5 μC/g.

EXAMPLE 4

| | |
|---|---|
| Styrene-n-butylacrylate (copolymerization wt. ratio = 7.5:2.5, Mw = 290,000) | 100 parts |
| Magnetic iron oxide ($BET = 6.5\ m^2/g$, $\sigma s = 65.6$ emu/g) | 60 parts |
| Negative charge controller (monoazo dye iron complex) | 1 part |
| Low molecular weight polypropylene (Mw = 6000) | 3 parts |

Through the same process as in Example 1, negative chargeable magnetic toner with weight average particle size (D4) of 10.5 μm was provided. 0.6 part of hydrophobic silica fine particles (BET= 250 $m^2$/g, treated with hexamethyldisilazane) was added to 100 parts of the toner. This was mixed by a Henschel mixer, thereby providing a developer (4). |Qd| of this developer was 33.5 μC/g.

EXAMPLE 5

| | |
|---|---|
| Styrene-n-butylacrylate (copolymerization wt. ratio = 7.5:2.5, Mw = 290,000) | 100 parts |
| Magnetic iron oxide ($BET = 6.5\ m^2/g$, $\sigma s = 65.6$ emu/g) | 5 parts |
| Negative charge controller (monoazo dye iron complex) | 1 part |
| Low molecular weight polypropylene (Mw = 6000) | 4 parts |

Through the same process as in Example 1, negative chargeable magnetic toner with weight average particle size (D5) of 4.5 μm was provided. 2.0 parts of hydrophobic silica fine particles (BET= 200 $m^2$/g, treated with hexamethyldisilazane) was added to 100 parts of the toner. This was mixed by a Henschel mixer, thereby providing a developer having |Qd| of 104.5 μC/g.

Further Embodiment

Image forming apparatus was provided as shown in FIG. 11.

However, the electrostatic latent image bearing member 1 has a diameter of 30 mm and is made of OPC drum. The dark portion potential VD is −700 V, and the light portion potential VL is −150 V. The gap between the latent image bearing member and the developer carrying member is 150 μm. The developer carrying member 5 comprises a developing sleeve of aluminum cylinder having a diameter of 16 mm and having a mirror surface of a resin layer at the JIS center line average roughness (RA) of 0.8 μm and a layer thickness of approx. 7 μm. The developing magnetic pole provided 850 Gausses. The developer regulating member 3 has a urethane rubber blade having a thickness of 1.0 mm and a free length of 10 mm. It is contacted at a line pressure of 15 g/cm.

| | |
|---|---|
| Phenol resin | 100 parts |
| Graphite (particle size of approx. 7 μm) | 90 parts |
| Carbon black | 10 parts |

Figure 12:
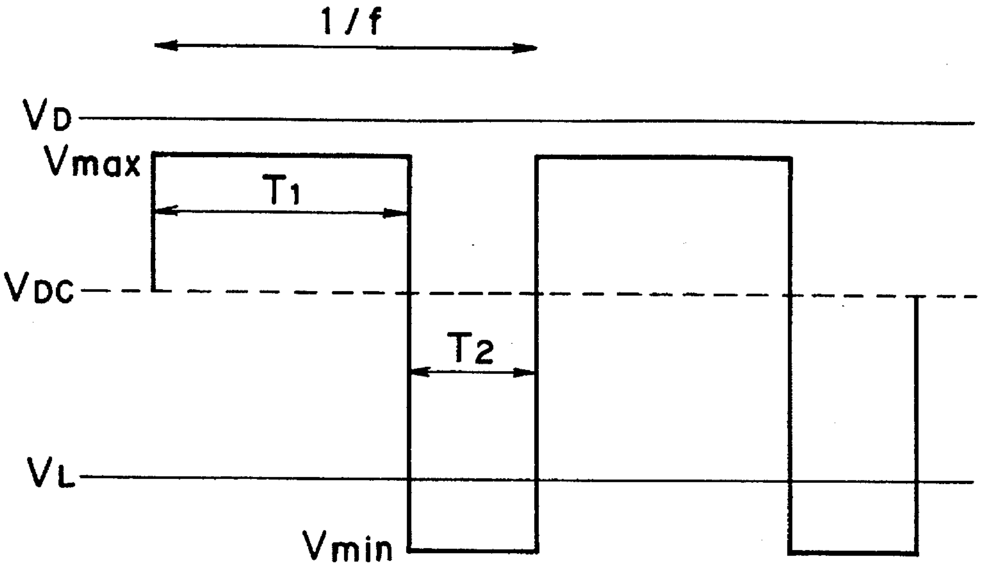
FIG. 12 schematically illustrates a developing bias voltage usable with the present invention.
Figure 13A:
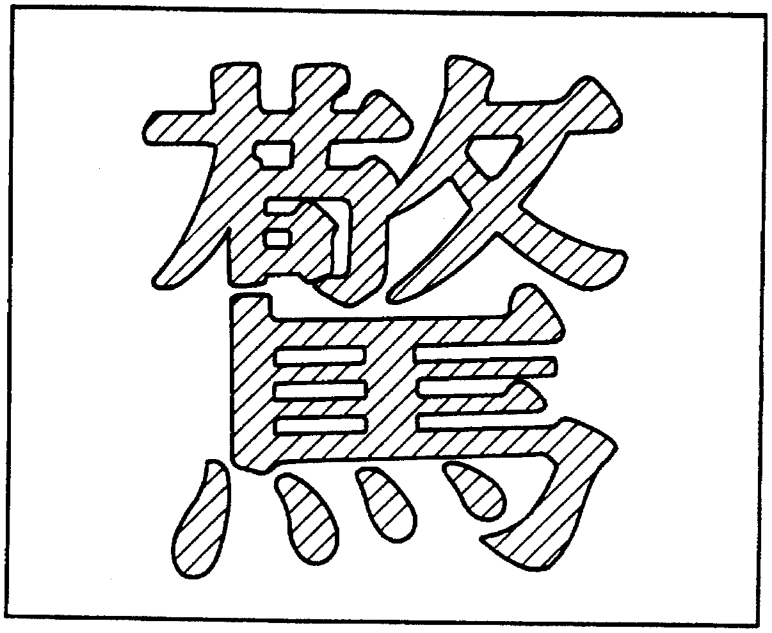
FIG. 13(*a*) and 13(*b*) schematically illustrate an image.
Figure 13B:
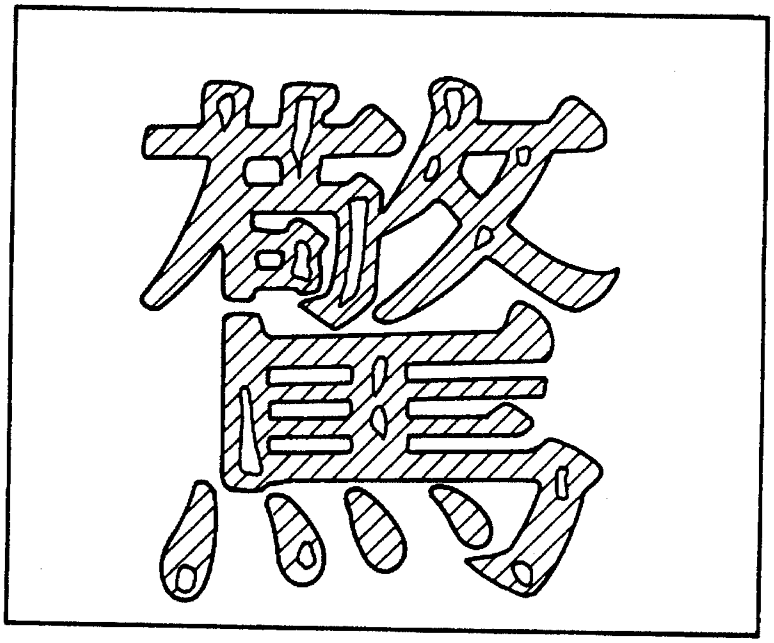

Subsequently, a developing bias voltage shown in FIG. 12 (DC bias component Vdc= −440 V, an AC bias component Vmax= −690 V, Vmin= −90 V (duty ratio T1:T2=7:5), and frequency= 1000 Hz) was applied. A transfer roller 15 comprises ethylene-propylene rubber in which conductive carbon is dispersed, and has a diameter of 20 mm, and a contact pressure of 50 g/cm was used. A transfer bias voltage of +2 KV was applied. The developer used was developer (1) in the abovedescribed Example 1. Under these conditions 3000 sheets have been subjected to image forming operation under 23° C. and 65%RH. As a result, good images have been produced even after 3000 sheets are printed continuously without a transfer void as shown in FIG. 13(*a*) and without image scattering on the image. The amount of the fog is measured using a reflection type density meter (Tokyo Denshoku Co. Ltd., REFLECTOMETER MODL TC-6DS). The reflection image density of the white background at the worst level after the printing is Ds, and the average reflection image density of the paper before the printing is Dr. The amount of fog is defined as Ds-Dr. It was satisfactory because it is as low as 1.5% (if it is lower than 2%, it means that the image substantially involves no fog, if it is larger than 5%, then the fog is remarkable). One dot latent image having a size of 80 μm was sufficiently developed. At this time, |Qd|/|Qm| was 3.7.

Further Embodiment

This is a modification of the embodiment described immediately above, and the developer was developer (2) manufactured through Example 2, and the frequency was 2500 Hz. In other respects, this example is the same as the embodiment described immediately above. The amount of fog is 1.0%, and the transfer void and the scattering were not observed in the image. The resolution of one dot latent image of 82 μm was satisfactory. |Qd|/|Qm| at this time was 5.0.

Further Embodiment

This is a modification of the same with the exception that the developer used was developer (3) manufactured through Example 3. The amount of fog was 3.8% without transfer void and toner scattering. The resolution of one dot latent image of 80 μm was satisfactory. |Qd|/|Qm| was 9.7 at this time.

Further Embodiment

This is a modification of the same with the exception that the JIS center line average roughness (RA) of the developing sleeve was 2.5 μm. The amount of fog was 4.6% without transfer void and toner scattering. The resolution of one dot latent image of 80 μm was satisfactory. |Qd|/|Qm| was 5.8 in this embodiment.

Comparison Example 1

This is the same as in the embodiment using developer (1) with the except that the developer was developer (4) manufactured in accordance with Example 4. The amount of fog was satisfactory (2.8%). However, transfer void and toner scattering occurred as shown in FIG. 13(*b*). The resolution of the developed image from one dot latent image of 80 μm was unsatisfactory. |Qd|/|Qm| was 4.0 in this Example.

Comparison Example 2

This is the same as in the embodiment using developer (1) with the exception that the developer used was developer (5) manufactured through Example 5. The amount of fog was 7.5% (practically not tolerable). Reduction of the image density and coating non-uniformity of the toner on the developing sleeve, were observed (image density non-uniformity of a solid black image on an image). The resolution of the one dot latent image of 80 μm was unsatisfactory. |Qd|/|Qm| was 6.3 in this Example.

Comparison Example 3

Figure 14:
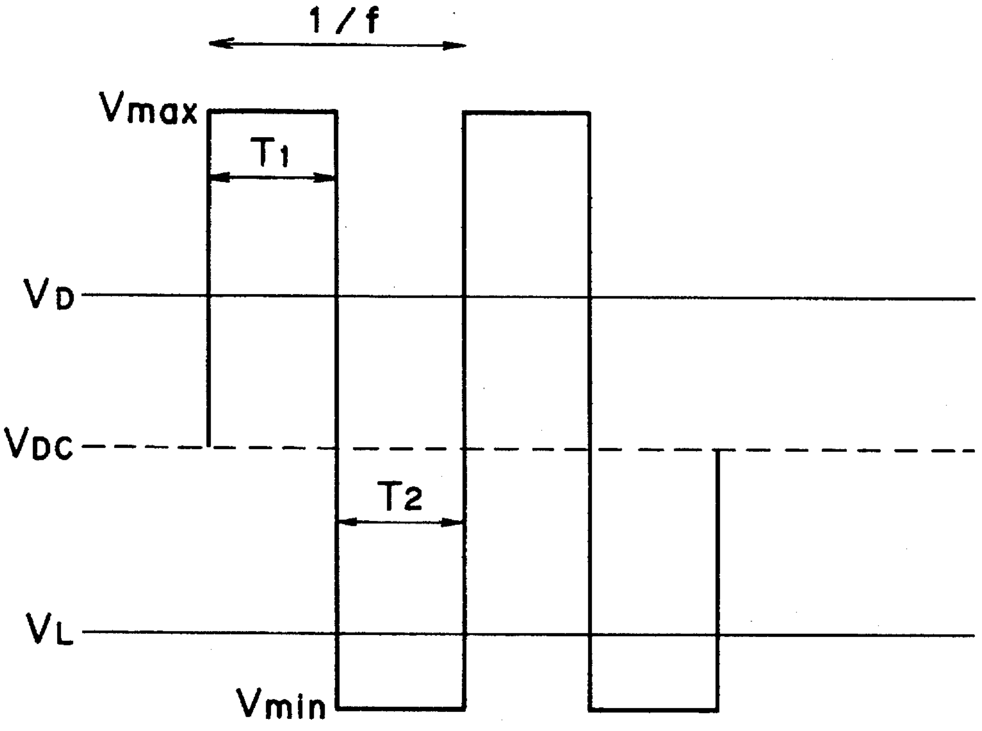
FIG. 14 schematically illustrates a developing bias voltage used in Comparison Example 3.

This is the same as in the Embodiment using developer (1) with the exception that Vmax= −840 V, and Vmin= −40 V (duty ratio Ti:T2= 1:1) in the developing bias, as shown in FIG. 14. The amount of fog was unsatisfactory (5.9%). The image was not sharp. |Qd|/|Qm| was 3.4 in this Example.

While the invention has been described with reference to the structures disclosed herein, it is not confined to the details set forth and this application is intended to cover such modifications or changes as may come within the purposes of the improvements or the scope of the following claims.

What is claimed is:

1. A developing apparatus comprising:

a developer carrying member for opposing an image bearing member bearing an electrostatic image and for carrying a developer to develop the electrostatic image on the image bearing member, the developer having a polarity which is the same as a charging polarity of the image bearing member; and bias voltage applying means for applying an oscillating bias voltage to said developer carrying member;

wherein the bias voltage oscillates interposing an image portion potential of the image bearing member, wherein a time average voltage of the bias voltage is between the background portion potential of said image bearing member and the image portion potential of said image bearing member, and wherein an absolute value of a peak level of a bias voltage for moving the developer from said developer carrying member toward the image bearing member is smaller than an absolute value of a background portion potential.

2. An apparatus according to claim 1, further comprising means for changing a ratio of a period of the oscillating voltage and a time in which the voltage is in a background potential side beyond a center of the voltage without changing the voltage level of the bias voltage.

3. An apparatus according to claim 1, wherein the bias voltage has a rectangular wave form.

4. An apparatus according to claim 1, wherein the developer is a one component magnetic developer.

5. An apparatus according to claim 4, wherein an absolute value of triboelectric charge Qd relative to iron powder of the developer is not less than 40 and not more than 100 μC/g.

6. An apparatus according to claim 5, wherein said developer carrying mender has a resin surface layer containing electrically conductive particles, and the following relation is satisfied:

$$2.5 \leqq |Qd|/|Qm| \leqq 15.$$

where Qm is an absorption method triboelectric charge on said developer carrying member.

7. An apparatus according to claim 1, wherein said developer carrying member forms a gap relative to said image bearing member.

8. An apparatus according to claim 7, further comprising regulating means for regulating a thickness of a layer of developer on said developer carrying member to be carried to a position where said developer carrying member is opposed to said image bearing member.

9. An apparatus according to claim 1, wherein a time period of the background portion side potential of the bias voltage is larger than 50% of the period of the bias voltage.

* * * * *

UNITED STATES PATENT AND TRADEMARK OFFICE
CERTIFICATE OF CORRECTION

PATENT NO. : 5,534,982 
DATED : July 9, 1996
INVENTOR(S) : KATSUHIRO SAKAIZAWA, ET AL.

It is certified that error appears in the above-indentified patent and that said Letters Patent is hereby corrected as shown below:

Column 3

Line 31, ", does" should read --does--.

Column 4

Line 28, "comprising:" should read --comprising--.
Line 30, "for" should read --for carrying--.
Line 33, "member; should read --member and--.
Line 38, "absolute" should read --absolute value--.
Line 43, "a to" should read --a developer to--.

Column 5

Line 42, "5" should read --5 is--.

Column 6

Line 19, "reverse-developed" should read --reverse-develop--.
Line 56, "floes" should read --does--.
Line 66, "portion." should read --portion--.

Column 7

Line 10, "abovedescribed" should read --above-described--.

UNITED STATES PATENT AND TRADEMARK OFFICE
CERTIFICATE OF CORRECTION

PATENT NO. : 5,534,982

DATED : July 9, 1996

INVENTOR(S) : KATSUHIRO SAKAIZAWA, ET AL.

It is certified that error appears in the above-indentified patent and that said Letters Patent is hereby corrected as shown below:

Column 9

Line 2, "confirm" should read --confirmed--.
Line 15, "for" should read --it--.
Line 35, "thereto.." should read --thereto.--.

Column 10

Line 11, "potential." should read --potential--.

Column 11

Line 14, "3:" should read --3;--.
Line 26, "powders:" should read --powders--.
Line 55, "results" should read --result--.

Column 12

Line 64, "Qm" should read --Qm is--.

Column 13

Line 19, "present," should read --present, and--.

Column 14

Line 32, "size." should read --sizes.--.
Line 48, "oxide" should read --oxide,--.
Line 53, "Styrene" should read --styrene--.

UNITED STATES PATENT AND TRADEMARK OFFICE

CERTIFICATE OF CORRECTION

PATENT NO. : 5,534,982

DATED : July 9, 1996

INVENTOR(S) : KATSUHIRO SAKAIZAWA, ET AL.

It is certified that error appears in the above-indentified patent and that said Letters Patent is hereby corrected as shown below:

Column 16

Line 40, "represents" should read --represented--.

Column 18

Line 40, "blow" should read --blown--.

Column 21

Line 7, "except" should read --exception--.

Column 22

Line 25, "member" should read --member--.
Line 30, "2.5 $\leq |Qd|/|Qm| \leq$ 1.5." should read --2.5 $\leq |Qd|/|Qm| \leq$ 1.5,--.

Signed and Sealed this

Twenty-sixth Day of November 1996

Attest:

BRUCE LEHMAN

Attesting Officer

Commissioner of Patents and Trademarks